(12) United States Patent
Hwang et al.

(10) Patent No.: US 8,786,763 B2
(45) Date of Patent: Jul. 22, 2014

(54) DEVICE FOR TRANSPORTING OPTICAL ELEMENT AND PHOTOGRAPHING APPARATUS INCLUDING THE DEVICE

(75) Inventors: Young-jae Hwang, Suwon-si (KR); Kwang-seok Byon, Yongin-si (KR); Hyoung-wook Cho, Changwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 86 days.

(21) Appl. No.: 13/546,175

(22) Filed: Jul. 11, 2012

(65) Prior Publication Data

US 2013/0128093 A1 May 23, 2013

(30) Foreign Application Priority Data

Nov. 18, 2011 (KR) .......................... 10-2011-0121193

(51) Int. Cl.
*H04N 5/232* (2006.01)
*H04N 5/225* (2006.01)

(52) U.S. Cl.
USPC ............ 348/357; 348/373; 348/374; 348/375

(58) Field of Classification Search
None
See application file for complete search history.

(56) References Cited

U.S. PATENT DOCUMENTS

| | | | |
|---|---|---|---|
| 2008/0068489 A1* | 3/2008 | Watanabe et al. | 348/340 |
| 2009/0237794 A1* | 9/2009 | Yumiki et al. | 359/557 |
| 2013/0141789 A1* | 6/2013 | Noguchi | 359/557 |

* cited by examiner

*Primary Examiner* — Lin Ye
*Assistant Examiner* — John H Morehead, III
(74) *Attorney, Agent, or Firm* — Drinker Biddle & Reath LLP

(57) ABSTRACT

A device for transporting an optical element so that inclination of the optical element is substantially prevented to more precisely control the position of the optical element, including: a base; a transporting member that supports the optical element and is movably disposed along a predetermined direction with respect to the base; a magnet extending from the base along a movement direction of the transporting member; a coil that is coupled to the transporting member and generates a magnetic field when an electrical signal is applied thereto; and a magnetic substrate that is disposed on the transporting member and applies a force to the transporting member toward the magnet due an action of a magnetic force between the magnet and the magnetic substrate.

17 Claims, 5 Drawing Sheets

DEVICE FOR TRANSPORTING OPTICAL ELEMENT AND PHOTOGRAPHING APPARATUS INCLUDING THE DEVICE

CROSS-REFERENCE TO RELATED PATENT APPLICATION

This application claims the priority benefit of Korean Patent Application No. 10-2011-0121193, filed on Nov. 18, 2011, in the Korean Intellectual Property Office, which is incorporated herein in its entirety by reference.

BACKGROUND

1. Field of the Invention

The invention relates to a device for transporting an optical element and a photographing apparatus including the device, and more particularly, to a device for transporting an optical element so that inclination of the optical element is substantially prevented in order to more precisely control the position of the optical element, and a photographing apparatus including the device.

2. Description of the Related Art

A photographing apparatus such as a digital camera or a digital video camera includes a device moving an optical element such as a lens in order to perform auto focusing (AF) by automatically adjusting a position of the optical element, and/or zooming.

Recently, as compact digital cameras having high optical performance are highly demanded, the position of the optical element needs to be determined more precisely. Thus, to perform focusing and/or zooming, an optical element is moved in an optical axis direction using an additional driving source such as a step motor, an ultrasonic motor, or a voice coil motor (VCM).

However, while the optical element is being moved, the optical element may be inclined with respect to a plane perpendicular to an optical axis due to mechanical factors such as a design tolerance. The inclination of the optical element causes an error in the position of the optical element, thereby deteriorating the optical performance of a digital camera.

SUMMARY

The invention provides a device for transporting an optical element while more precisely controlling a position of the optical element by substantially preventing inclination thereof.

The invention also provides a photographing apparatus with improved optical performance by precisely controlling a position of an optical element.

According to an aspect of the invention, there is provided a device for transporting an optical element, the device comprising: a base; a transporting member that supports the optical element and is movably disposed along a predetermined direction with respect to the base; a magnet extending from the base along a movement direction of the transporting member; a coil that is coupled to the transporting member and generates a magnetic field when an electrical signal is applied thereto; and a magnetic substrate that is disposed on the transporting member and applies a force to the transporting member toward the magnet due to an action of a magnetic force between the magnet and the magnetic substrate.

The magnetic substrate may be disposed in a surface of the transporting member facing the magnet.

The magnetic substrate may be disposed adjacent to the coil of the transporting member.

A groove may be formed in a surface of the transporting member facing the magnet, and the magnetic substrate may be disposed in the groove.

The magnetic substrate may include a metal selected from the group consisting of iron, nickel, and cobalt.

The device may further comprise a yoke comprising a first yoke portion that extends from the base to face the magnet and a second yoke portion that is attached to the magnet to support the magnet.

The transporting member may be movably disposed along an extension direction of the first yoke portion outside of the first yoke portion, and the coil may be coupled to the transporting member to surround the first yoke portion.

The base may include a guide that movably supports the transporting member in a straight direction with respect to the base.

The device may further comprise a ball bearing that movably supports the transporting member with respect to the base between the base and the transporting member.

The transporting member may have a groove having a V-shaped cross-section, the ball bearing is rotatably inserted into the groove, and the base may have a guide groove having a V-shaped cross-section, which corresponds to the groove in the transporting member and guides a movement of the transporting member.

According to another aspect of the invention, there is provided a photographing apparatus comprising: a base; a transporting member that supports an optical element and is movably disposed along a predetermined direction with respect to the base; an imaging device that is coupled to the base and converts light transmitted through the optical element into an electrical signal; a magnet extending from the base along a movement direction of the transporting member; a coil that is coupled to the transporting member and generates a magnetic field when an electrical signal is applied thereto; and a magnetic substrate that is disposed on the transporting member and applies a force to the transporting member toward the magnet due to an action of a magnetic force between the magnet and the magnetic substrate.

The magnetic substrate may be disposed in a surface of the transporting member facing the magnet.

The magnetic substrate may be disposed adjacent to the coil of the transporting member.

A groove may be formed in a surface of the transporting member facing the magnet, and the magnetic substrate may be disposed in the groove.

The transporting member may be movably disposed along an optical axis of the optical element with respect to the base.

The photographing apparatus may further comprise a yoke comprising a first yoke portion that extends from the base to face the magnet and a second yoke portion that is attached to the magnet to support the magnet.

The transporting member may be movably disposed along an extension direction of the first yoke portion outside the first yoke portion, and the coil may be coupled to the transporting member to surround the first yoke portion.

The base may include a guide that movably supports the transporting member in a straight direction with respect to the base.

The photographing apparatus may further comprise a ball bearing that movably supports the transporting member with respect to the base between the base and the transporting member.

BRIEF DESCRIPTION OF THE DRAWINGS

The above and other features and advantages of the invention will become more apparent in review of detail exemplary embodiments thereof with reference to the attached drawings, in which.

DETAILED DESCRIPTION

Hereinafter, preferred embodiments of the invention will be described with reference to the attached drawings. As used herein, the term "and/or" includes any and all combinations of one or more of the associated listed items. Expressions such as "at least one of," when preceding a list of elements, modify the entire list of elements and do not modify the individual elements of the list.

Figure 1:
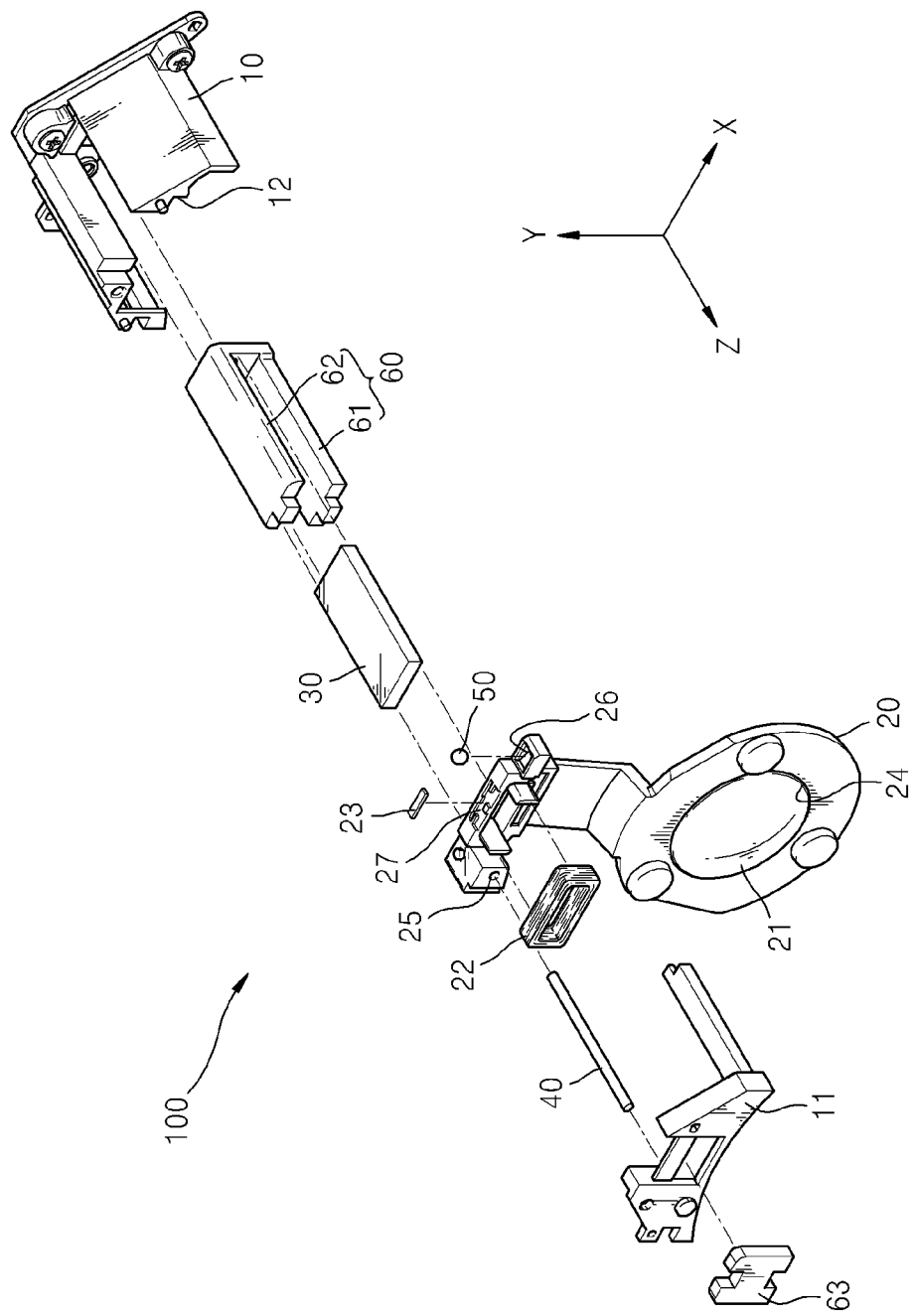
FIG. 1 is an exploded isometric view illustrating coupling relationships between components of a device for transporting an optical element, according to an embodiment of the invention.
Figure 2:
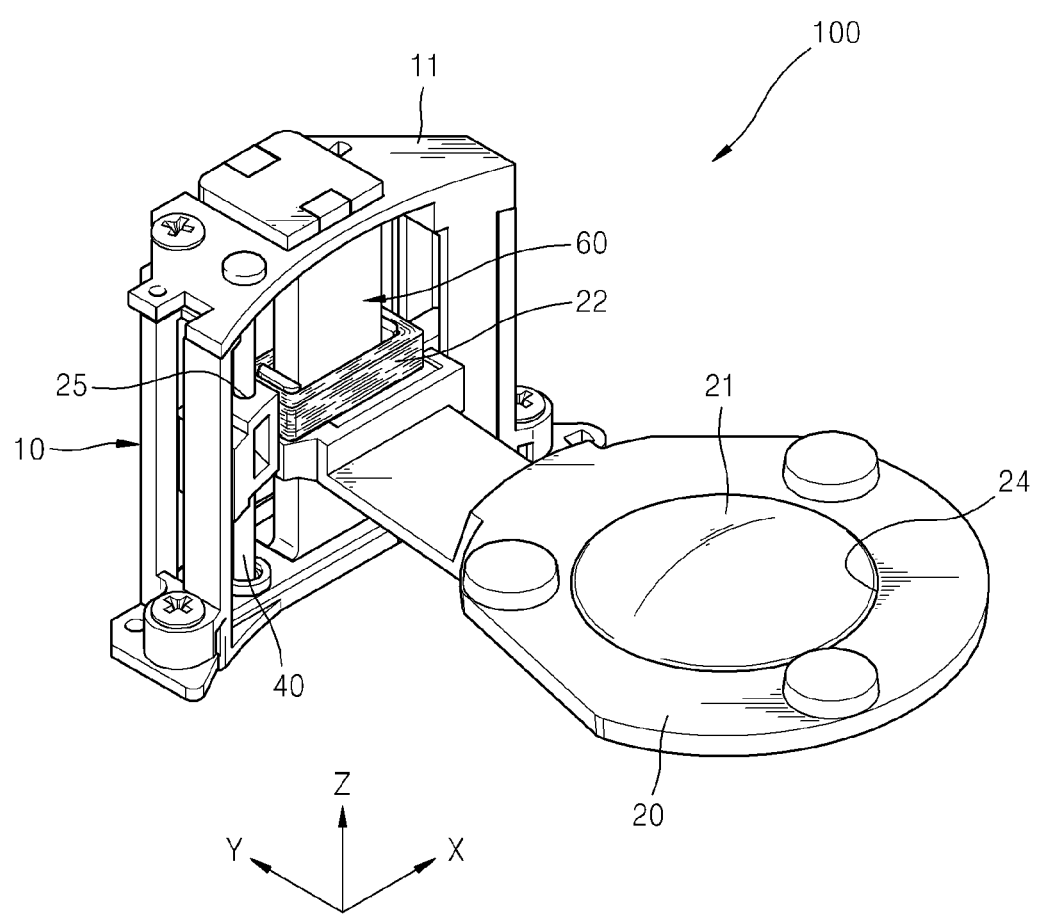
FIG. 2 is an isometric view of the device for transporting an optical element, in which the components of FIG. 1 are coupled.

FIG. 1 is an exploded isometric view illustrating coupling relationships between components of a device for transporting an optical element 100, according to an embodiment of the invention. FIG. 2 is an isometric view of the device for transporting an optical element 100, in which the components of FIG. 1 are coupled.

Referring to FIGS. 1 and 2, the device for transporting an optical element 100 includes a base 10, a transporting member 20 that supports an optical element 21 and is disposed to be movable along a predetermined direction (e.g., a Z-axis direction) with respect to the base 10, a magnet 30 that extends on the base 10 along a movement direction of the transporting member 20, a coil 22 that is coupled to the transporting member 20 and generates a magnetic field when an electrical signal is applied thereto, and a magnetic substrate 23 that is disposed in the transporting member 20 and applies a force to the transporting member 20 toward the magnet 30 due to an action of a magnetic force between the magnet 30 and the magnetic substrate 23.

The base 10 includes a guide 40 that movably supports the transporting member 20 in a straight direction (e.g., the Z-axis direction) with respect to the base 10. A through hole 24, through which light may be transmitted, is formed in a predetermined portion of the transporting member 20, and the optical element 21 is disposed to correspond to the through hole 24 to be thereby supported by the transporting member 20. The optical element 21 may be, for example, a lens, a filter, or an aperture, and a plurality of optical elements 21 may be included. The movement direction of the transporting member 20 (e.g., the Z-axis direction) may be a direction extending from a center of the optical element 21, that is, an optical axis direction.

A guide through hole 25 is formed in a first side of the transporting member 20, through which the guide 40 may pass. The guide through hole 25 may have a diameter greater than a vertical cross-section of the guide 40 so that the transporting member 20 may move along the guide 40. According to this design tolerance, the transporting member 20 may be inclined at a predetermined angle with respect to a plane perpendicular to the guide 40. This will be described in detail later.

A groove 26 that is V-shaped is formed in a second side of the transporting member 20, and a ball bearing 50 is rotatably inserted into the groove 26. The base 10 includes a guide groove 12 having a V-shape, which corresponds to the groove 26 and guides the transporting member 20 via the ball bearing 50. That is, the ball bearing 50 is interposed between the transporting member 20 and the base 10 to guide the movement of the transporting member 20. When guiding the transporting member 20 using the ball bearing 50, friction generated as the transporting member 20 moves may be reduced. The groove 26 and the guide groove 12 may have cross-sections of a semi-circle shape or a polygonal shape instead of the V-shape.

The coil 22 functioning as a driving source is coupled to the transporting member 20 between the guide through hole 25, through which the guide 40 of the transporting member 20 passes through, and the groove 26 having a V-shaped cross-section. An electrical signal is applied to the coil 22 by a power supply device (not shown), and when a current flows through the coil 22, a magnetic field is generated. As a direction of the current flowing through the coil 22 changes, a direction of the magnetic field changes.

The magnet 30 extends from the base 10 along the movement direction of the transporting member 20 (e.g., the Z-axis direction). The magnet 30 generates a magnetic field in an area where the coil 22 is disposed. The magnetic field generated by the magnet 30 interacts with the magnetic field that is generated when a current flows through the coil 22, thereby generating a force urging the coil 22 in a predetermined direction. Due to this urging force, the coil 22, that is, the transporting member 20 coupled to the coil 22 moves along the guide 40. The transporting member 20 may move in a +Z direction or a −Z direction according to a direction of a current flowing through the coil 22. The magnet 30 may be a permanent magnet or an electromagnet.

The device for transporting an optical 100 element according to the current embodiment of the invention further includes a yoke 60 including a first yoke portion 61 extending from the base 10 to face the magnet 30 and a second yoke portion 62 that is attached to the magnet 30 to support the magnet 30. The yoke 60 further includes a connection portion 63 connecting the first yoke portion 61 and the second yoke portion 62 and has a rectangular shape.

The transporting member 20 is movably disposed along an extension direction of the first yoke portion 61 outside the first yoke portion 61, and the coil 22 is coupled to the transporting member 20 to surround the first yoke portion 61.

The yoke 60 having a rectangular shape confines a magnetic field generated by the magnet 30 inside the yoke 60 and uniformizes a magnetic flux density in the yoke 60. Due to the yoke 60, a magnetic field generated by the magnet 30 is blocked in an area of the coil 22 disposed outside the yoke 60, and a uniform magnetic field is formed in an area of the coil 22 inside the yoke 60. Thus, a movement speed and direction of the transporting member 20 may be determined by adjusting an intensity and direction of a current applied to the coil 22. The yoke 60 may include, for example, iron (Fe).

The magnetic substrate 23 is placed in a surface of the transporting member 20 facing the magnet 30. The magnetic substrate 23 applies a force to the transporting member 20 toward the magnet 30 due to an action of a magnetic force between the magnetic substrate 23 and the magnet 30. The magnetic substrate 23 may include a metal selected from the group consisting of iron (Fe), nickel (Ni), and cobalt (Co).

The magnetic substrate 23 may be disposed adjacent to the coil 22 of the transporting member 20, and disposed in a groove 27 formed in a surface of the transporting member 20 facing the magnet 30.

A magnetic field is formed between the magnetic substrate 23 and the magnet 30, and may influence an interaction between a magnetic field that is uniformly formed by the magnet 30 in the yoke 60 and a magnetic field generated by a current flowing through the coil 22. Accordingly, by disposing the magnetic substrate 23 adjacent to the coil 22, the influence on the interaction may be reduced. Also, because a magnetic field between the magnetic substrate 23 and the magnet 30 becomes stronger as a distance between the magnetic substrate 23 and the magnet 30 is reduced, the magnetic substrate 23 is disposed in the groove 27 formed in the transporting member 20 to reduce a disturbance of the magnetic field. However, if the distance between the magnetic substrate 23 and the magnet 30 is too large, a force applied to the transporting member 20 toward the magnet 30 may be reduced, and thus, an appropriate distance needs to be selected.

Although one magnetic substrate 23 is disposed in the groove 27 in the current embodiment, the embodiments of the invention are not limited thereto, and the magnetic substrates 23 may be more than one, and the magnetic substrate 23 may protrude from the transporting member 20.

The device for transporting an optical element 100 according to the current embodiment of the invention may be modularized by mounting the transporting member 20, the coil 22, the magnet 30, the guide 40, the ball bearing 50, the first yoke portion 61, and the second yoke portion 62 on the base 10, and coupling the base 10 and a base cover 11.

Figure 3:
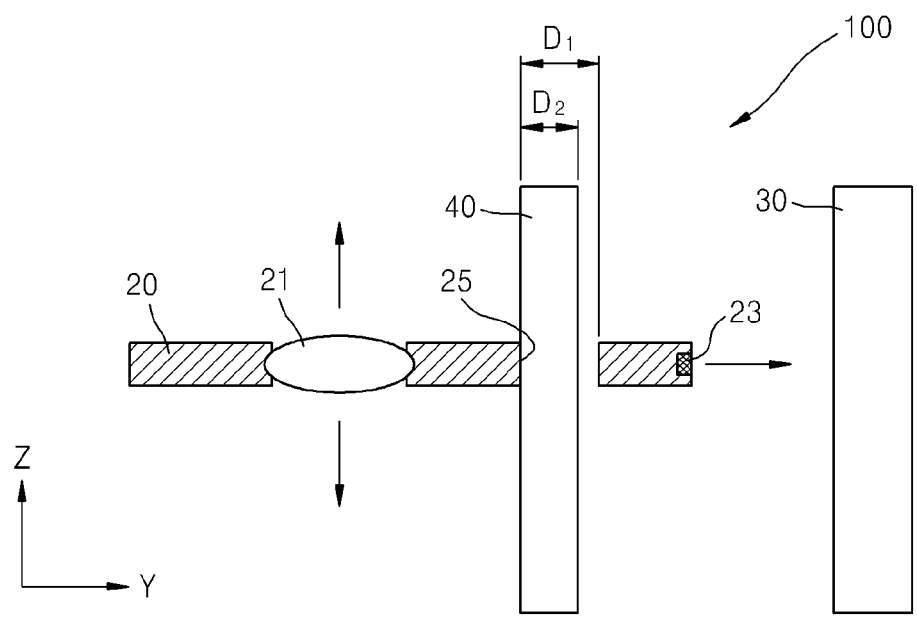
FIG. 3 is a schematic cross-sectional view of some of the components of the device of FIG. 2.
Figure 4:
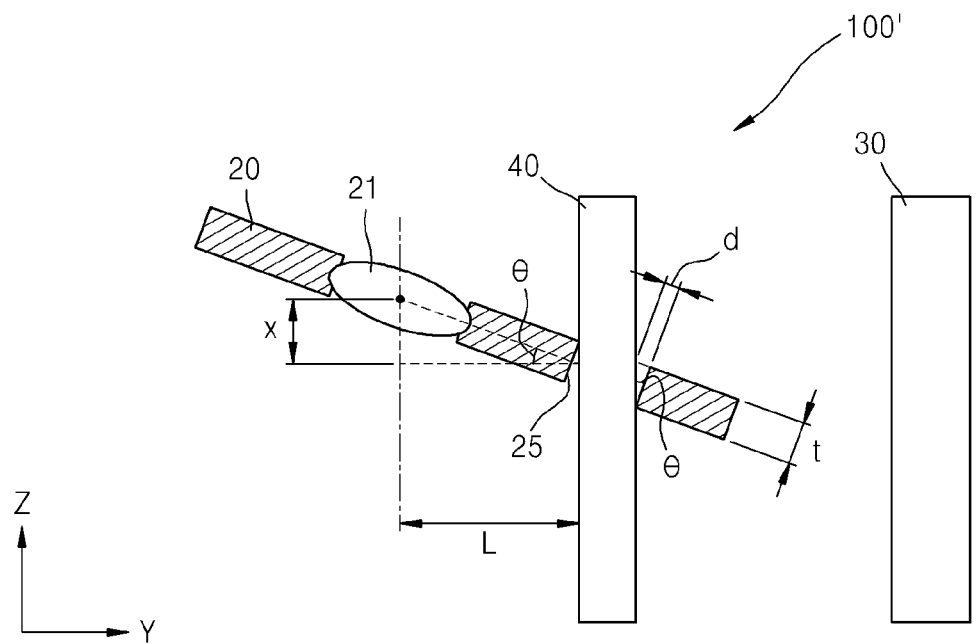
FIG. 4 is a cross-sectional view of a device for transporting an optical element, according to a comparative example.

FIG. 3 is a schematic cross-sectional view of some of components of the device for transporting an optical element 100 of FIG. 2, and FIG. 4 is a cross-sectional view of a device for transporting an optical element 100', according to a comparative example.

Referring to FIG. 3, the guide 40 is inserted into the guide through hole 25 formed in the transporting member 20; a diameter D1 of the guide through hole 25 is greater than a diameter D2 of the guide 40. That is, there is a predetermined tolerance D1-D2 between the guide through hole 25 and the guide 40. The magnet 30 is spaced apart from the transporting member 20. The magnetic substrate 23 is disposed in the surface of the transporting member 20 facing the magnet 30.

Due to a magnetic force acting between the magnetic substrate 23 and the magnet 30, the magnetic substrate 23 is acted upon by an attracting force and is pulled toward the magnet 30, and the attraction force is transferred to the transporting member 20 to which the magnetic substrate 23 is coupled. Thus, the transporting member 20 moves toward the magnet 30. A predetermined portion of the guide through hole 25 formed in the transporting member 20 contacts the guide 40, and this contact state is substantially maintained while the transporting member 20 moves in a predetermined direction (e.g., the Z-axis direction).

Accordingly, while moving, the transporting member 20 is held substantially perpendicular to the guide 40, and is not inclined with respect to a surface perpendicular to the guide 40. Consequently, a position of the optical element 21 coupled to the transporting member 20 may be more precisely controlled.

Referring to FIG. 4, a guide 40 is inserted into a guide through hole 25 formed in a transporting member 20. A predetermined tolerance d exists between the transporting member 20 and the guide 40 so that the transporting member 20 is movable with respect to the guide 40. A magnet 30 is spaced apart from the transporting member 20. The transporting member 20 of FIG. 4 does not include a magnetic substrate 23 as in the embodiment of FIG. 3, and thus, a force acting toward the magnet 30 is not applied to the transporting member 20.

The transporting member 20 moves in a predetermined direction (e.g., the Z-axis direction), and due to the tolerance d between the transporting member 20 and the guide 40, the transporting member 20 may become inclined at a predetermined angle θ with respect to the surface perpendicular to the guide 40.

For example, if the tolerance is 0.015 mm, and a height t of a portion supported by the guide 40 is 1.2 mm, the angle θ at which the transporting member 20 is inclined with respect to the surface perpendicular to the guide 40 is $\tan^{-1}(0.015/1.2)$, that is, about 0.7 degree.

The inclination of the transporting member 20 causes a positional error of the optical element 21 that is supported by the transporting member 20. That is, when a distance L between the optical element 21 and the guide 40 is 30 mm, a position error value x of the optical element 21 due to the inclination of the transporting member 20 is 30×tan(0.7), that is, about 0.37 mm.

When the optical element 21 is mounted in, for example, a photographing apparatus, the positional error value x affects zooming and/or auto-focusing of the photographing apparatus and deteriorates the optical performance of the photographing apparatus.

According to the current embodiment of the invention, the transporting member 20 is movable in a substantially straight direction with respect to the base 10 via the guide 40, but the embodiments of the invention are not limited thereto. That is, for example, an extension groove may be formed in the base 10 in a straight direction, and the transporting member 20 may be inserted into the extension groove and move thereinside. The transporting member 20 is closely adhered toward the magnet 30, and thus, an inclination of the transporting member 20 may be substantially prevented. In addition, at least two transporting members 20 may be included.

Figure 5:
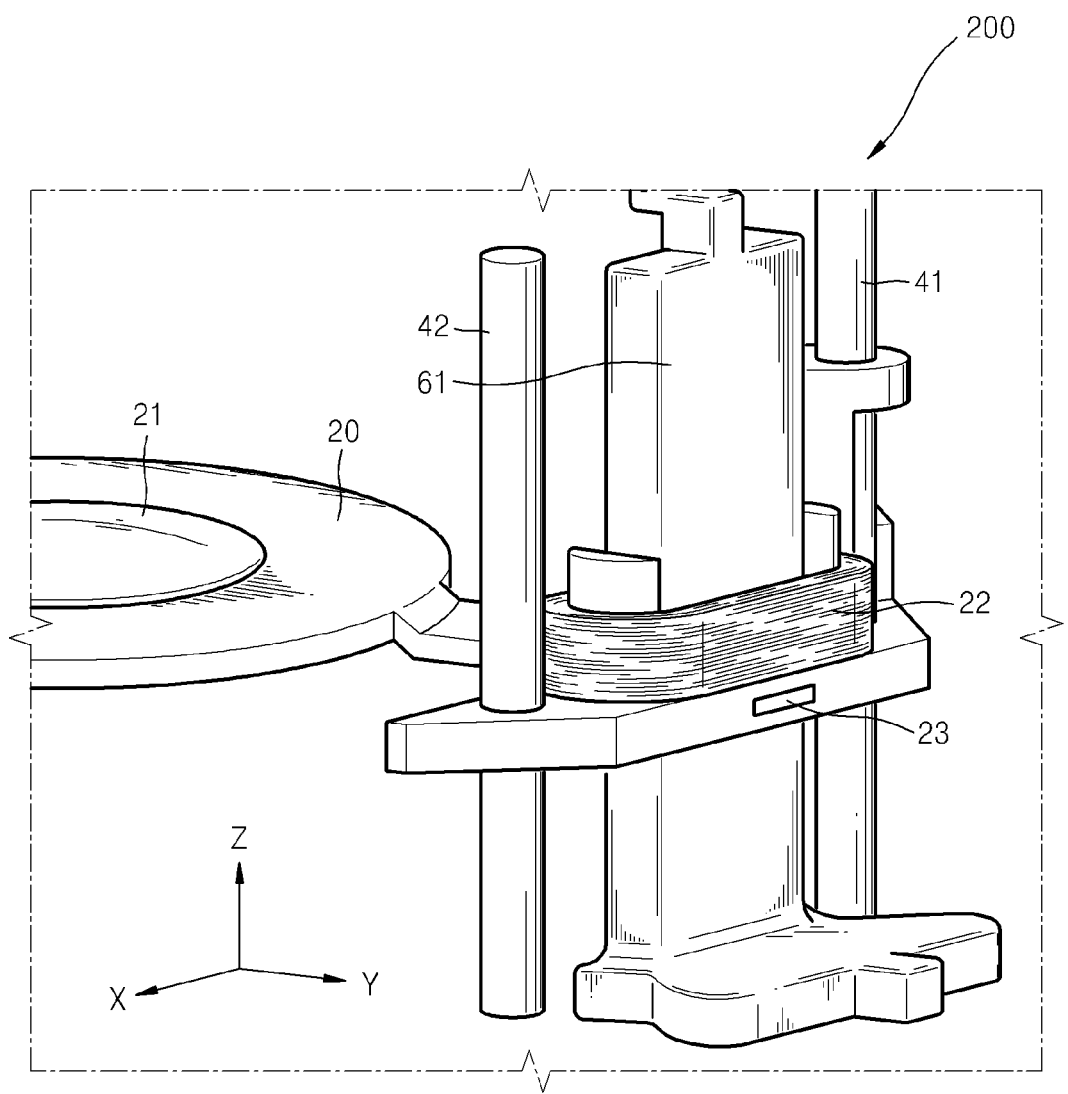
FIG. 5 is an isometric view of some of components of a device for transporting an optical element, according to another embodiment of the invention.

FIG. 5 is an isometric view of some of components of a device for transporting an optical element 200, according to another embodiment of the invention.

The device for transporting an optical element 200 of FIG. 5 is identical to that illustrated in FIGS. 1 and 2 except that a first guide 41 and a second guide 42 are disposed on two sides of the transporting member 20, but the ball bearing 50 of FIG. 1 is excluded. When using the first and second guides 41 and 42, the transporting member 20 may support the transporting member 20 more firmly and may guide the same.

Figure 6:
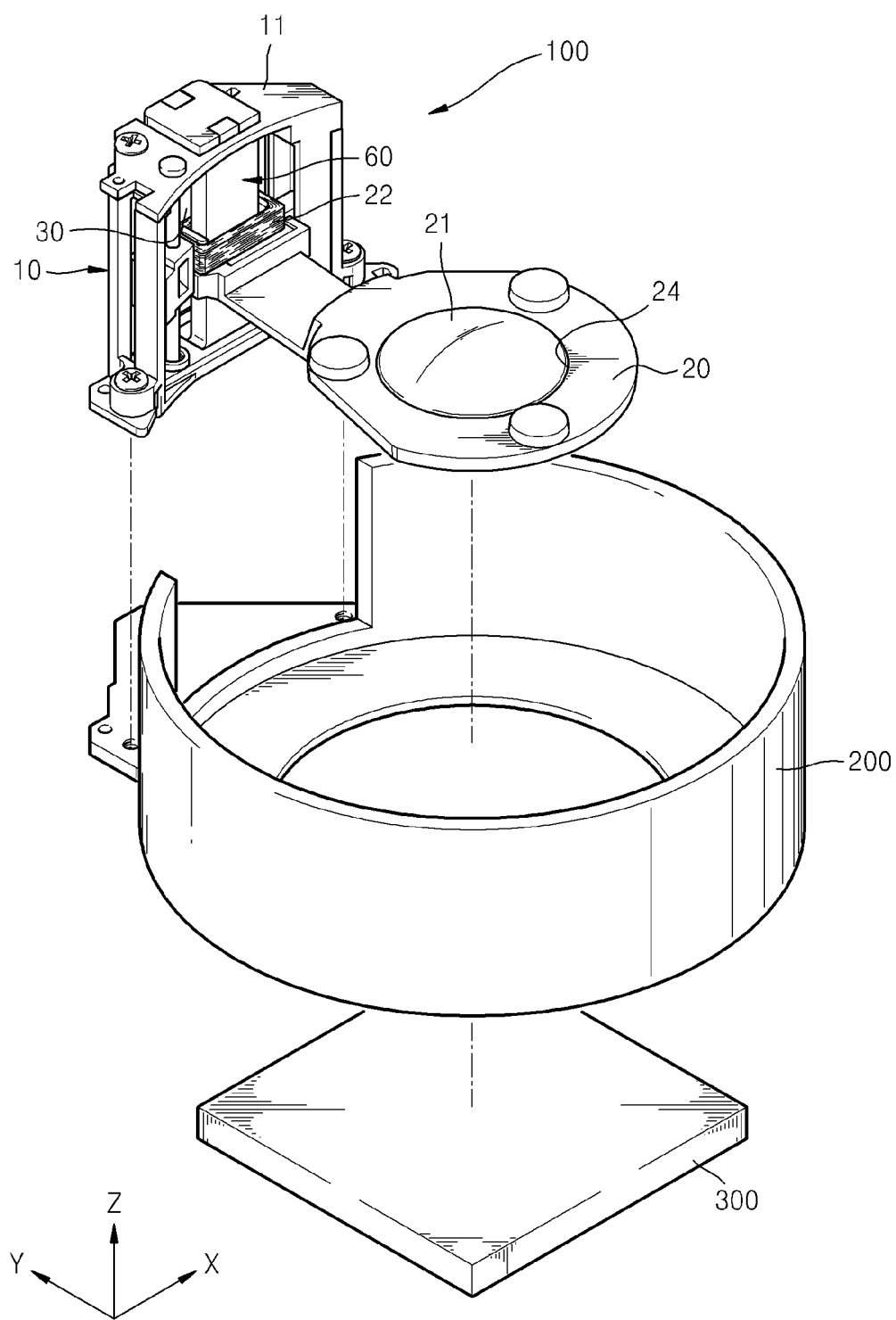
FIG. 6 is an isometric view illustrating a photographing apparatus including the device of FIG. 2 for transporting an optical element, according to an embodiment of the invention.

FIG. 6 is an isometric view illustrating a photographing apparatus including the device for transporting an optical element 100 of FIGS. 1 and 2, according to an embodiment of the invention.

The photographing apparatus of FIG. 6 includes the device for transporting an optical element 100 of FIGS. 1 and 2, a cylindrical barrel unit 200, and an imaging device 300.

The device for transporting an optical element 100 is arranged in the cylindrical barrel unit 200. The transporting member 20 including the optical element 21, the coil 22 driving the transporting member 20 in an optical axis direction (e.g., the Z-axis direction), the magnet 30, and the yoke 60 is disposed in the device for transporting an optical element 100. The optical element 21 may be, for example, a lens, a filter, or an aperture, and a plurality of optical elements 21 may be included. The transporting member 20 moves along the optical axis direction which passes through the center of the plurality of the optical element 21, thereby performs zooming and/or auto-focusing.

High optical performance of the photographing apparatus may be obtained by precisely adjusting positions of the optical element 21. To precisely adjust the positions of the optical element 21, the optical element 21 are to be maintained substantially perpendicular to the optical axis direction. However, if the optical element 21 is inclined with respect to a plane perpendicular to the optical axis direction, a positional error is caused, resulting in deterioration of optical performance such as inaccurate focus.

However, the transporting member 20 included in the photographing apparatus according to the current embodiment of the invention includes the magnetic substrate 23 (see FIG. 1) in a surface thereof facing the magnet 30, thereby substantially preventing inclination of the transporting member 20, that is, inclination of the optical elements 21 of the transporting member 20.

The device for transporting an optical element 100 may be coupled to the barrel unit 200 as a module, or the base 10 included in the device for transporting an optical element 100 may be configured as a single unit with the barrel unit 200. Also, a sensor unit (not shown) sensing the positions of the optical elements 21 may be coupled to the barrel unit 200 and perform zooming and/or auto-focusing by adjusting the positions of the optical elements 21 according to feedback based on sensed position information.

The imaging device 300 is disposed to correspond to the optical element 21, and converts light transmitted through the optical element 21 to an electrical signal. The imaging device 300 may be a photoelectric conversion device such as a charge coupled device (CCD) or a complementary metal oxide semiconductor (CMOS).

The light that has passed through the optical element 21 is imaged on an imaging surface of the imaging device 300. A position where the imaging surface of the imaging device 300 is disposed and an area corresponding to a focal length of the optical element 21 may be adjusted to correspond to each other, thereby adjust a focus of the photographing apparatus.

In the photographing apparatus according to the current embodiment of the invention, the magnetic substrate 23 is disposed in the transporting member 20 to substantially prevent inclination of the optical elements 21. Accordingly, a positional error of the optical element 21 due to inclination of the optical elements 21 is reduced and thus more accurate auto-focusing of the photographing apparatus is provided, thereby improving the optical performance of the photographing apparatus.

According to the device for transporting an optical element according to the embodiments of the invention, an additional force is applied to a transporting member to substantially prevent inclination of an optical element, thereby more precisely controlling a position of the optical element.

Also, a photographing apparatus including the device for transporting an optical element may have improved optical performance by more precisely controlling a position of the optical element.

The device described herein may comprise a processor, a memory for storing program data and executing it, a permanent storage such as a disk drive, a communications port for handling communications with external devices, and user interface devices, including a display, keys, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A device for transporting an optical element, the device comprising:
   a base;
   a transporting member that supports the optical element and is movably disposed along a predetermined direction with respect to the base;
   a magnet extending from the base along a movement direction of the transporting member;
   a coil that is coupled to the transporting member and generates a magnetic field when an electrical signal is applied thereto;
   a magnetic substrate that is disposed on the transporting member and applies a force to the transporting member toward the magnet due to an action of a magnetic force between the magnet and the magnetic substrate; and
   a yoke portion that extends from the base to face the magnet,
   wherein the transporting member is movably disposed along an extension direction of the yoke portion outside of the yoke portion, and the coil is coupled to the transporting member to surround the yoke portion.

2. The device of claim 1, wherein the magnetic substrate is disposed in a surface of the transporting member facing the magnet.

3. The device of claim 1, wherein the magnetic substrate is disposed adjacent to the coil of the transporting member.

4. The device of claim 1, wherein a groove is formed in a surface of the transporting member facing the magnet, and the magnetic substrate is disposed in the groove.

5. The device of claim 1, wherein the magnetic substrate includes a metal selected from the group consisting of iron, nickel, and cobalt.

6. The device of claim 1, wherein the yoke portion is a first yoke portion of a yoke, the device further comprising second yoke portion that is attached to the magnet to support the magnet.

7. The device of claim 1, wherein the base includes a guide that movably supports the transporting member in a straight direction with respect to the base.

8. The device of claim 7, further comprising a ball bearing that movably supports the transporting member with respect to the base between the base and the transporting member.

9. The device of claim 8, wherein the transporting member has a groove, the ball bearing is rotatably inserted into the groove, and the base has a guide groove, which corresponds to the groove in the transporting member and guides a movement of the transporting member.

10. A photographing apparatus comprising:
    a base;
    a transporting member that supports an optical element and is movably disposed along a predetermined direction with respect to the base;
    an imaging device that is coupled to the base and converts light transmitted through the optical element into an electrical signal;
    a magnet extending from the base along a movement direction of the transporting member;
    a coil that is coupled to the transporting member and generates a magnetic field when an electrical signal is applied thereto;
    a magnetic substrate that is disposed on the transporting member and applies a force to the transporting member toward the magnet due to an action of a magnetic force between the magnet and the magnetic substrate;
    a yoke portion that extends from the base to face the magnet,
    wherein the transporting member is movably disposed along an extension direction of the yoke portion outside of the yoke portion, and the coil is coupled to the transporting member to surround the yoke portion.

11. The photographing apparatus of claim 10, wherein the magnetic substrate is disposed in a surface of the transporting member facing the magnet.

12. The photographing apparatus of claim 10, wherein the magnetic substrate is disposed adjacent to the coil of the transporting member.

13. The photographing apparatus of claim 10, wherein a groove is formed in a surface of the transporting member facing the magnet, and the magnetic substrate is disposed in the groove.

14. The photographing apparatus of claim 10, wherein the transporting member is movably disposed along an optical axis of the optical element with respect to the base.

15. The photographing apparatus of claim 10, wherein the yoke portion is a first portion of a yoke, the photographing apparatus further comprising second yoke portion that is attached to the magnet to support the magnet.

16. The photographing apparatus of claim 10, wherein the base includes a guide that movably supports the transporting member in a straight direction with respect to the base.

17. The photographing apparatus of claim 16, further comprising a ball bearing that movably supports the transporting member with respect to the base between the base and the transporting member.

* * * * *